(12) United States Patent
Pastouchenko et al.

(10) Patent No.: US 11,097,849 B2
(45) Date of Patent: Aug. 24, 2021

(54) AIRCRAFT HAVING AN AFT ENGINE

(71) Applicant: General Electric Company, Schenectady, NY (US)

(72) Inventors: Nikolai N. Pastouchenko, Glenville, NY (US); Randy M. Vondrell, Cincinnati, OH (US); Kurt David Murrow, Springboro, OH (US); Jixian Yao, Niskayuna, NY (US); Brandon Wayne Miller, Liberty Township, OH (US); Patrick Michael Marrinan, Mason, OH (US); Daniel Alan Niergarth, Norwood, OH (US); Narendra Digamber Joshi, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 16/126,269

(22) Filed: Sep. 10, 2018

(65) Prior Publication Data

US 2020/0079513 A1 Mar. 12, 2020

(51) Int. Cl.
*B64D 27/02* (2006.01)
*B64D 27/12* (2006.01)
(Continued)

(52) U.S. Cl.
CPC ............. *B64D 27/02* (2013.01); *B64D 27/12* (2013.01); *B64D 27/24* (2013.01); *F01D 9/02* (2013.01); *F02C 6/14* (2013.01); *F02K 1/18* (2013.01); *F02K 5/00* (2013.01); *B64D 2027/026* (2013.01); *F05D 2220/323* (2013.01); *F05D 2220/76* (2013.01); *F05D 2240/12* (2013.01);
(Continued)

(58) Field of Classification Search
CPC ........ B64D 27/02; B64D 27/12; B64D 27/24; B64D 2027/026; F01D 9/02; F02C 6/14; F02K 1/18; F02K 5/00; F05D 2220/323; F05D 2220/76; F05D 2240/12; F05D 2240/128; F05D 2270/09
See application file for complete search history.

(56) References Cited

U.S. PATENT DOCUMENTS 2,219,303 A 10/1940 Fraser
2,462,201 A 2/1949 Kilgore et al.
(Continued)

FOREIGN PATENT DOCUMENTS

CN 103228872 A 7/2013
CN 103998723 A 8/2014
(Continued)

OTHER PUBLICATIONS

European Search Report Corresponding to Application No. 19195085 dated Jan. 21, 2020.
(Continued)

*Primary Examiner* — Rodney A Bonnette
(74) *Attorney, Agent, or Firm* — Dority & Manning, P.A.

(57) ABSTRACT

A method for operating an electric fan of an aircraft propulsion system includes driving a plurality of fan blades of the electric fan with an electric machine to generate thrust for the aircraft; and driving the electric machine with the plurality of fan blades of the electric fan to generate electrical power subsequent to driving the plurality of fan blades of the electric fan with the electric machine to generate thrust for the aircraft.

20 Claims, 7 Drawing Sheets

(51) Int. Cl.
*B64D 27/24* (2006.01)
*F01D 9/02* (2006.01)
*F02C 6/14* (2006.01)
*F02K 1/18* (2006.01)
*F02K 5/00* (2006.01)

(52) U.S. Cl.
CPC .... *F05D 2240/128* (2013.01); *F05D 2270/09* (2013.01)

(56) References Cited

U.S. PATENT DOCUMENTS

| | | |
|---|---|---|
| 2,477,637 A | 8/1949 | Mercier |
| 2,812,912 A | 11/1957 | Stevens et al. |
| 2,918,229 A | 12/1959 | Lippisch |
| 3,194,516 A | 7/1965 | Messerschmitt |
| 3,237,891 A | 3/1966 | Wotton |
| 3,286,470 A | 11/1966 | Gerlaugh |
| 3,289,975 A | 12/1966 | Hall |
| 3,312,448 A | 4/1967 | Hull, Jr. et al. |
| 3,598,211 A | 8/1971 | Fergle |
| 3,662,975 A | 5/1972 | Driskill |
| 3,844,110 A | 10/1974 | Widlansky et al. |
| 3,957,229 A | 5/1976 | Davis |
| 3,999,115 A | 12/1976 | South et al. |
| 4,089,493 A | 5/1978 | Paulson |
| 4,114,246 A | 9/1978 | Kamman |
| 4,311,253 A | 1/1982 | Putman et al. |
| 4,370,560 A | 1/1983 | Faulkner et al. |
| 4,371,133 A | 2/1983 | Edgley |
| 4,456,204 A | 6/1984 | Hapke |
| 4,605,185 A | 8/1986 | Reyes |
| 4,722,357 A | 2/1988 | Wynosky |
| 4,913,380 A | 4/1990 | Vardaman et al. |
| 5,050,446 A | 9/1991 | Takashima et al. |
| 5,174,109 A | 12/1992 | Lampe |
| 5,721,402 A | 2/1998 | Parente |
| 5,799,484 A | 9/1998 | Nims |
| 5,899,411 A | 5/1999 | Latos et al. |
| 5,927,644 A | 7/1999 | Ellis et al. |
| 6,045,325 A | 4/2000 | Horvath et al. |
| 6,082,670 A | 7/2000 | Chapman |
| 6,089,505 A | 7/2000 | Gruensfelder et al. |
| 6,105,697 A | 8/2000 | Weaver |
| 6,169,332 B1 | 1/2001 | Taylor et al. |
| 6,545,373 B1 | 4/2003 | Andres et al. |
| 6,834,831 B2 | 12/2004 | Daggett |
| 6,976,655 B2 | 12/2005 | Thompson |
| 6,992,403 B1 | 1/2006 | Raad |
| 7,107,756 B2 | 9/2006 | Rolt |
| 7,251,942 B2 | 8/2007 | Dittmar et al. |
| 7,267,300 B2 | 9/2007 | Heath et al. |
| 7,285,871 B2 | 10/2007 | Derouineau |
| 7,380,749 B2 | 6/2008 | Fucke et al. |
| 7,387,189 B2 | 6/2008 | James et al. |
| 7,417,337 B1 | 8/2008 | Suttie |
| 7,493,754 B2 | 2/2009 | Moniz et al. |
| 7,495,354 B2 | 2/2009 | Herrmann |
| 7,513,120 B2 | 4/2009 | Kupratis |
| 7,514,810 B2 | 4/2009 | Kern et al. |
| 7,528,499 B2 | 5/2009 | Suttie |
| 7,635,922 B2 | 12/2009 | Becker |
| 7,665,689 B2 | 2/2010 | McComb |
| 7,677,502 B2 | 3/2010 | Lawson et al. |
| 7,752,834 B2 | 7/2010 | Addis |
| 7,805,947 B2 | 10/2010 | Moulebhar |
| 7,806,363 B2 | 10/2010 | Udall et al. |
| 7,818,969 B1 | 10/2010 | Hotto |
| 7,819,358 B2 | 10/2010 | Belleville |
| 7,841,163 B2 | 11/2010 | Welch et al. |
| 7,905,449 B2 | 3/2011 | Cazals et al. |
| 7,952,244 B2 | 5/2011 | Colin |
| 7,958,727 B2 | 6/2011 | Arnold |
| 7,970,497 B2 | 6/2011 | Derouineau et al. |
| 7,975,465 B2 | 7/2011 | Morris et al. |
| 7,976,273 B2 | 7/2011 | Suciu et al. |
| 8,016,228 B2 | 9/2011 | Fucke et al. |
| 8,033,094 B2 | 10/2011 | Suciu et al. |
| 8,039,983 B2 | 10/2011 | Cote et al. |
| 8,099,944 B2 | 1/2012 | Foster et al. |
| 8,109,073 B2 | 2/2012 | Foster et al. |
| 8,128,019 B2 | 3/2012 | Annati et al. |
| 8,141,360 B1 | 3/2012 | Huber |
| 8,162,254 B2 | 4/2012 | Roche |
| 8,181,900 B2 | 5/2012 | Chene et al. |
| 8,193,761 B1 | 6/2012 | Singh |
| 8,201,414 B2 | 6/2012 | Haehner et al. |
| 8,220,739 B2 | 7/2012 | Cazals |
| 8,226,040 B2 | 7/2012 | Neto |
| 8,291,716 B2 | 10/2012 | Foster et al. |
| 8,317,126 B2 | 11/2012 | Harris et al. |
| 8,336,814 B2 | 12/2012 | Reinhardt |
| 8,432,048 B1 | 4/2013 | Paulino |
| 8,469,306 B2 | 6/2013 | Kuhn, Jr. |
| 8,489,246 B2 | 7/2013 | Dooley |
| 8,492,920 B2 | 7/2013 | Huang et al. |
| 8,522,522 B2 | 9/2013 | Poisson |
| 8,544,793 B1 | 10/2013 | Shammoh |
| 8,549,833 B2 | 10/2013 | Hyde et al. |
| 8,552,575 B2 | 10/2013 | Teets et al. |
| 8,561,413 B2 | 10/2013 | Taneja |
| 8,568,938 B2 | 10/2013 | Gao et al. |
| 8,596,036 B2 | 12/2013 | Hyde et al. |
| 8,631,657 B2 | 1/2014 | Hagen et al. |
| 8,640,439 B2 | 2/2014 | Hoffjann et al. |
| 8,651,414 B2 | 2/2014 | Cazals et al. |
| 8,657,227 B1 | 2/2014 | Bayliss et al. |
| 8,672,263 B2 | 3/2014 | Stolte |
| 8,684,304 B2 | 4/2014 | Burns et al. |
| 8,692,489 B2 | 4/2014 | Maalioune |
| 8,708,274 B2 | 4/2014 | Lord |
| 8,720,814 B2 | 5/2014 | Smith |
| 8,723,349 B2 | 5/2014 | Huang et al. |
| 8,723,385 B2 | 5/2014 | Jia et al. |
| 8,742,605 B1 | 6/2014 | Wilhide et al. |
| 8,836,160 B1 | 9/2014 | Paterson et al. |
| 8,857,191 B2 | 10/2014 | Hyde et al. |
| 8,866,318 B2 | 10/2014 | Langford et al. |
| 8,882,028 B2 | 11/2014 | Chase |
| 8,890,343 B2 | 11/2014 | Bulin et al. |
| 8,925,660 B2 | 1/2015 | Bowdich et al. |
| 8,928,166 B2 | 1/2015 | Seger et al. |
| 8,939,399 B2 | 1/2015 | Kouros et al. |
| 8,950,703 B2 | 2/2015 | Bayliss et al. |
| 8,957,539 B1 | 2/2015 | Ralston |
| 8,997,493 B2 | 4/2015 | Brust et al. |
| 8,998,580 B2 | 4/2015 | Quiroz-Hernandez |
| 9,004,849 B2 | 4/2015 | Munsell et al. |
| 9,038,398 B2 | 5/2015 | Suciu et al. |
| 9,045,996 B2 | 6/2015 | Anghel et al. |
| 9,059,440 B2 | 6/2015 | Hotto |
| 9,068,562 B1 | 6/2015 | Budica et al. |
| 9,143,023 B1 | 9/2015 | Uskert |
| 9,190,892 B2 | 11/2015 | Anthony |
| 9,260,195 B2 | 2/2016 | Oyori et al. |
| 9,376,213 B2 | 6/2016 | Rolt |
| 9,637,217 B2 | 5/2017 | Marrinan et al. |
| 9,764,848 B1 | 9/2017 | Vondrell et al. |
| 9,815,560 B2 | 11/2017 | Marrinan et al. |
| 9,821,917 B2 | 11/2017 | Becker et al. |
| 9,884,687 B2 | 2/2018 | Marrinan et al. |
| 2003/0011198 A1 | 1/2003 | Eccles et al. |
| 2003/0127930 A1 | 7/2003 | Mackulin et al. |
| 2005/0056021 A1 | 3/2005 | Belokon et al. |
| 2006/0011779 A1 | 1/2006 | Cazals et al. |
| 2006/0037325 A1 | 2/2006 | Peters et al. |
| 2006/0042252 A1 | 3/2006 | Derouineau |
| 2006/0232250 A1 | 10/2006 | Sihler et al. |
| 2007/0108771 A1 | 5/2007 | Jones et al. |
| 2007/0279012 A1 | 12/2007 | Sihler |
| 2008/0023590 A1 | 1/2008 | Merrill et al. |
| 2008/0056892 A1 | 3/2008 | Barton et al. |
| 2008/0121756 A1 | 5/2008 | McComb |
| 2009/0001940 A1 | 1/2009 | Sihler et al. |

(56) References Cited

U.S. PATENT DOCUMENTS

| | | |
|---|---|---|
| 2009/0127384 A1 | 5/2009 | Voorhees |
| 2009/0179424 A1 | 7/2009 | Yaron |
| 2010/0023621 A1 | 1/2010 | Ezolt et al. |
| 2010/0038473 A1 | 2/2010 | Schneider et al. |
| 2010/0058731 A1 | 3/2010 | Haehner et al. |
| 2010/0083669 A1 | 4/2010 | Foster et al. |
| 2010/0141193 A1 | 6/2010 | Rotondo et al. |
| 2010/0294882 A1 | 11/2010 | Gantie et al. |
| 2011/0016882 A1 | 1/2011 | Woelke et al. |
| 2011/0115444 A1 | 5/2011 | Markunas et al. |
| 2011/0169443 A1 | 7/2011 | Baker et al. |
| 2011/0215204 A1 | 9/2011 | Evulet |
| 2012/0006935 A1 | 1/2012 | Bhargava |
| 2012/0017602 A1 | 1/2012 | Hansen et al. |
| 2012/0076635 A1 | 3/2012 | Atassi |
| 2012/0119020 A1 | 5/2012 | Burns et al. |
| 2012/0138736 A1 | 6/2012 | Cazals et al. |
| 2012/0153076 A1 | 6/2012 | Burns et al. |
| 2012/0209456 A1 | 8/2012 | Harmon et al. |
| 2012/0214605 A1 | 8/2012 | Snook et al. |
| 2012/0221157 A1 | 8/2012 | Finney et al. |
| 2013/0032215 A1 | 2/2013 | Streifinger |
| 2013/0036760 A1 | 2/2013 | Bruno et al. |
| 2013/0052005 A1 | 2/2013 | Cloft |
| 2013/0062885 A1 | 3/2013 | Taneja |
| 2013/0076120 A1 | 3/2013 | Wagner et al. |
| 2013/0088019 A1 | 4/2013 | Huang et al. |
| 2013/0094963 A1 | 4/2013 | Rolt |
| 2013/0099065 A1 | 4/2013 | Stuhlberger |
| 2013/0099608 A1 | 4/2013 | Bradley et al. |
| 2013/0139515 A1 | 6/2013 | Schlak |
| 2013/0147192 A1 | 6/2013 | Condon et al. |
| 2013/0154359 A1 | 6/2013 | Huang et al. |
| 2013/0184958 A1 | 7/2013 | Dyrla et al. |
| 2013/0199624 A1 | 8/2013 | Smith et al. |
| 2013/0227950 A1 | 9/2013 | Anderson et al. |
| 2013/0234506 A1 | 9/2013 | Langford et al. |
| 2013/0251525 A1 | 9/2013 | Saiz |
| 2013/0284279 A1 | 10/2013 | Richards |
| 2013/0306024 A1 | 11/2013 | Rolt |
| 2013/0336781 A1 | 12/2013 | Rolt et al. |
| 2014/0010652 A1 | 1/2014 | Suntharalingam et al. |
| 2014/0060995 A1 | 3/2014 | Anderson et al. |
| 2014/0084677 A1 | 3/2014 | Haillot |
| 2014/0151495 A1 | 6/2014 | Kuhn, Jr. |
| 2014/0179535 A1 | 6/2014 | Stuckl et al. |
| 2014/0212279 A1 | 7/2014 | Boudebiza et al. |
| 2014/0245748 A1 | 9/2014 | Anghel et al. |
| 2014/0250161 A1 | 9/2014 | Tang |
| 2014/0250861 A1 | 9/2014 | Eames |
| 2014/0252161 A1 | 9/2014 | Gukeisen |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0000252 A1 | 1/2015 | Moore et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | LePeuvedie |
| 2015/0089921 A1 | 4/2015 | Rideau et al. |
| 2015/0091375 A1 | 4/2015 | Mackin |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0158597 A1 | 6/2015 | Suciu et al. |
| 2015/0159552 A1 | 6/2015 | Rodriguez et al. |
| 2015/0183522 A1 | 7/2015 | Ouellette |
| 2015/0226156 A1 | 8/2015 | Tillman et al. |
| 2015/0285144 A1 | 10/2015 | Todorovic et al. |
| 2015/0291285 A1 | 10/2015 | Gallet |
| 2015/0380999 A1 | 12/2015 | Joshi et al. |
| 2016/0061053 A1 | 3/2016 | Thomassin |
| 2016/0214717 A1 | 7/2016 | DeSilva |
| 2016/0214727 A1 | 7/2016 | Hamel et al. |
| 2016/0257416 A1 | 9/2016 | Himmelmann et al. |
| 2016/0332741 A1 | 11/2016 | Moxon |
| 2016/0340051 A1 | 11/2016 | Edwards et al. |
| 2016/0355272 A1 | 12/2016 | Moxon |
| 2016/0376918 A1 | 12/2016 | Swann et al. |
| 2017/0044989 A1 | 2/2017 | Gemin et al. |
| 2017/0081034 A1 | 3/2017 | Marrinan et al. |
| 2017/0081035 A1 | 3/2017 | Becker et al. |
| 2017/0081036 A1 | 3/2017 | Marrinan et al. |
| 2017/0081037 A1 | 3/2017 | Marrinan et al. |
| 2017/0101191 A1 | 4/2017 | Becker et al. |
| 2017/0114664 A1 | 4/2017 | Gemin et al. |
| 2017/0275009 A1 | 9/2017 | Huang |
| 2018/0037331 A1 | 2/2018 | Suciu et al. |
| 2018/0037333 A1 | 2/2018 | Willford et al. |
| 2018/0044028 A1 | 2/2018 | Takami et al. |
| 2018/0050810 A1 | 2/2018 | Niergarth et al. |
| 2018/0050811 A1 | 2/2018 | Niergarth et al. |
| 2018/0230845 A1 | 8/2018 | Joshi et al. |

FOREIGN PATENT DOCUMENTS

| | | |
|---|---|---|
| CN | 104229137 A | 12/2014 |
| DE | 102008004054 A1 | 7/2009 |
| EP | 1947311 A2 | 7/2008 |
| EP | 2657457 A2 | 10/2013 |
| EP | 2728141 A2 | 5/2014 |
| EP | 3094235 A1 | 11/2016 |
| FR | 1181456 A | 6/1959 |
| FR | 2993859 A1 | 1/2014 |
| GB | 406713 A | 2/1934 |
| GB | 1024894 A | 4/1966 |
| GB | 2489311 A | 9/2012 |
| JP | H02164695 A | 6/1990 |
| JP | 2010516546 A | 5/2010 |
| WO | WO2010/020199 A1 | 2/2010 |
| WO | WO2014/123740 A1 | 8/2014 |

OTHER PUBLICATIONS

Wikipedia, Ram Air Turbine 3 pages, Pub date Feb. 4, 2019 https://en.wikipedia.org/w/index_php?title=Ram_air_turbine&oldid=823981433.

Boeing Researches Alternative Propulsion and Fuel Options, Aviation Week & Space Technology, Jun. 4, 2012, pp. 1-5. http://aviationweek.com/awin/boeing-researches-alternative-propulsion-and-fuel-options.

Bauhaus Lufthrt, Concept Study Fuselage: Adding an Extra Engine to Reduce Emissions, May 20, 2014, 2 Pages.

Wikipedia, Boeing 737, Feb. 4, 2017 https://en.wikipedia.org/wiki/Boeing_737.

Zahringer, Towards the Powerhouse for More Electric Aircraft-Dedicated Engine Concepts, American Institute of Aeronautics and Astronautics, Inc., ISABE-2009-1166, 2009, pp. 1-7. (Website Only) (https://www.tib.eu/en/search/id/BLCP%3ACN075079458/TOWARDS-THE-POWERHOUSE-FOR-MORE-ELECTRIC-AIRCRAFT/).

Schneider, Clad in Controversy, IEEE Spectrum, vol. 50, Issue 8, Aug. 2013, pp. 32-37. (Abstract Only).

Geng et al., Stability Analysis and Improvements for Variable-Speed Multipole Permanent Magnet Synchronous Generator-Based Wind Energy Conversion System, IEEE Transactions on Sustainable Energy, vol. 2, No. 4, Oct. 2011, pp. 459 to 467.

(56) References Cited

OTHER PUBLICATIONS

Hasse and Wrede, Torsional Visco-Dampers, May 2015. http://www.hassewrede.com/en/produkte/viscodmpfer/viscodmpfer_1.jsp.
Bradley et al., Subsonic Ultra Green Aircraft Research, Phase II: N+4 Advanced Concept Development, NASA/CR-2012-217556, May 2012, pp. 93-96.

AIRCRAFT HAVING AN AFT ENGINE

FIELD

The present subject matter relates generally to an aircraft having an aft engine, or more particularly to an aircraft including an electrically driven aft fan.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage.

In addition, a conventional commercial aircraft will include a ram air turbine. The ram air turbine may generally be housed within the fuselage of the aircraft, and only deployed in the event of a failure of one or both of the primary aircraft engines (e.g., the turbofan jet engines). The ram air turbine may be utilized to extract energy from an airflow over the fuselage of the aircraft and convert such energy to electrical power. The electrical power may be utilized in such a failure mode.

However, ram air turbines add expense and cost to the production of the aircraft, as well as weight to the aircraft during normal operations. Accordingly, an aircraft including one or more features capable of replacing the ram air turbine would be useful. Specifically, an aircraft including one or more features for generating electrical power during a failure condition without use of a dedicated ram air turbine would be beneficial.

BRIEF DESCRIPTION

Aspects and advantages of the invention will be set forth in part in the following description, or may be obvious from the description, or may be learned through practice of the invention.

In one exemplary embodiment of the present disclosure, a method for operating an electric fan of an aircraft propulsion system is provided. The method includes driving a plurality of fan blades of the electric fan with an electric machine to generate thrust for the aircraft; and driving the electric machine with the plurality of fan blades of the electric fan to generate electrical power subsequent to driving the plurality of fan blades of the electric fan with the electric machine to generate thrust for the aircraft.

In certain exemplary aspects the electric fan is an electric fan of an aft engine of the aircraft propulsion system, and wherein driving the electric machine with the plurality of fan blades of the electric fan to generate electrical power includes modifying a variable geometry component of the aft engine.

For example, in certain exemplary aspects modifying the variable geometry component of the aft engine includes changing at least one of an effective pitch angle of a plurality of variable inlet guide vanes of the aft engine, an effective pitch angle of a plurality of variable outlet guide vanes of the aft engine, or an effective nozzle area for the aft engine.

For example, in certain exemplary aspects modifying the variable geometry component of the aft engine includes changing an effective pitch angle of a plurality of variable guide vanes of the aft engine.

For example, in certain exemplary aspects modifying the variable geometry component of the aft engine includes an effective nozzle area for the aft engine.

For example, in certain exemplary aspects the method further includes receiving data indicative of a failure condition of one or more components of the propulsion system, and wherein modifying the variable geometry component of the aft engine includes modifying the variable geometry component of the aft engine in response to receiving data indicative of the failure condition.

For example, in certain exemplary aspects modifying the variable geometry component of the aft engine includes modifying the variable geometry component of the aft engine to modify an amount of electrical power generated with the electric machine.

In certain exemplary aspects driving the plurality of fan blades of the electric fan with the electric machine includes driving the plurality of fan blades of the electric fan with the electric machine while the plurality of fan blades of the electric fan are in a first angular position, and wherein driving the electric machine with the plurality of fan blades of the electric fan to generate electrical power includes driving the electric machine with the plurality of fan blades of the electric fan to generate electrical power while the plurality of fan blades of the electric fan are in a second angular position.

For example, in certain exemplary aspects the method further includes moving the plurality of fan blades of the electric fan from the first angular position to the second angular position.

For example, in certain exemplary aspects the first angular position is a positive angular position, and wherein the second angular position is a negative angular position.

For example, in certain exemplary aspects the positive angular position and the negative angular position define an angular difference of at least about 20 degrees and up to about 100 degrees.

For example, in certain exemplary aspects the aircraft propulsion system further includes a first propulsor, and the method further includes receiving data indicative of a failure condition of the first propulsor, and wherein moving the plurality of fan blades of the electric fan includes moving the plurality of fan blades of the electric fan in response to receiving the data indicative of the failure condition of the first propulsor.

For example, in certain exemplary aspects the method further includes determining an air speed of the aircraft, a rotational speed of the electric fan, or both, and wherein moving the plurality of fan blades of the electric fan from the first angular position to the second angular position includes moving the plurality of fan blades of the electric fan from the first angular position to the second angular position based at least in part on the determined air speed of the aircraft, the determined rotational speed of the electric fan, or both.

For example, in certain exemplary aspects the method further includes driving the electric machine with the plurality of fan blades of the electric fan while the plurality of fan blades of the electric fan are in the first angular position to generate an initial amount of electrical power, and wherein moving the plurality of fan blades of the electric fan from the first angular position to the second angular position includes moving the plurality of fan blades of the electric fan from the first angular position to the second angular position using at least in part the initial amount of electrical power.

In certain exemplary aspects driving the plurality of fan blades of the electric fan with the electric machine includes rotating the plurality of fan blades of the electric fan in a first rotational direction, and wherein driving the electric machine with the plurality of fan blades of the electric fan includes rotating the plurality of fan blades of the electric fan in a second rotational direction, opposite the first rotational direction.

In certain exemplary aspects the aircraft propulsion system further includes a first propulsor, wherein the first propulsor is a gas powered propulsor, and wherein the method further includes operating the first propulsor to generate electrical power, and wherein driving the plurality of fan blades of the electric fan with the electric machine includes providing the electric machine with at least a portion of the electrical power generated through the operation of the first propulsor.

In certain exemplary aspects the aircraft includes an aft end, and wherein the electric fan is a boundary layer ingestion electric fan mounted at the aft end of the aircraft.

In certain exemplary aspects the electric machine of the electric fan is mechanically coupled to the plurality of fan blades of the electric fan through a gearbox.

In an exemplary embodiment of the present disclosure, an aircraft is provided. The aircraft includes a fuselage extending between a forward end and an aft end; a wing extending from the fuselage; and a propulsion system. The propulsion system includes an electric generator; a gas turbine engine mounted to the wing of the aircraft, the gas turbine engine configured to drive the electric generator to generate electric power; and an aft engine mounted to the fuselage at the aft end of the fuselage, the aft engine including a fan and an electric machine in electrical communication with the electric generator, the aft engine further including one or more variable geometry components. The electric machine of the aft engine is configured to drive the fan using at least in part the electric power generated by the electric generator in a first operating mode, and wherein the electric machine of the aft engine is configured to be driven by the fan to generate electrical power in a second operating mode.

In certain exemplary embodiments the aft engine defines an axial direction, wherein the fan includes a plurality of fan blades, wherein each fan blade of the plurality of fan blades defines a positive angle with the axial direction when the plurality of fan blades are in a first angular position, and wherein each fan blade of the plurality of fan blades defines a negative angle with the axial direction when the plurality of fan blades are in a second angular position, and wherein the electric machine is configured to drive the plurality of fan blades using at least in part the electric power generated by the electric generator when the plurality of fan blades are in the first angular position, and wherein the electric machine is configured to be driven by the plurality of fan blades when the plurality of fan blades are in the second angular position to generate electrical power.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
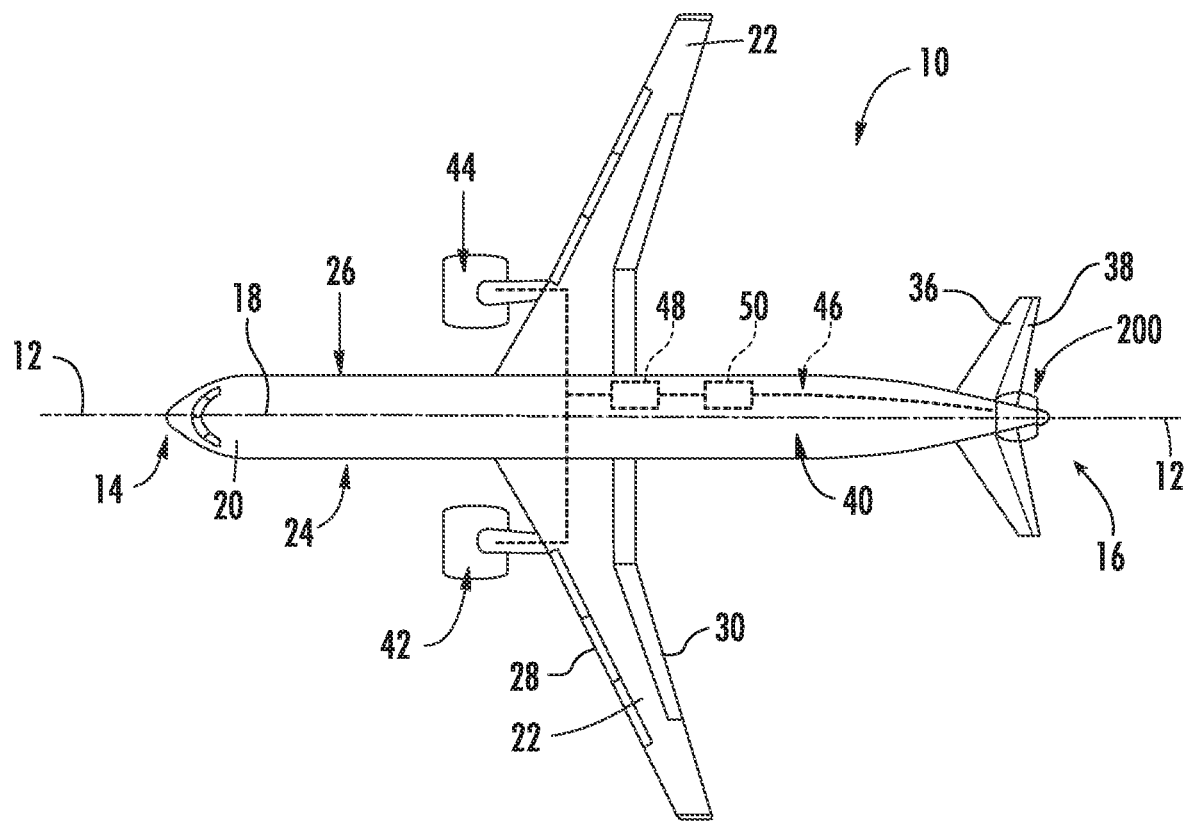
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within an engine or vehicle, and refer to the normal operational attitude of the engine or vehicle. For example, with regard to an engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
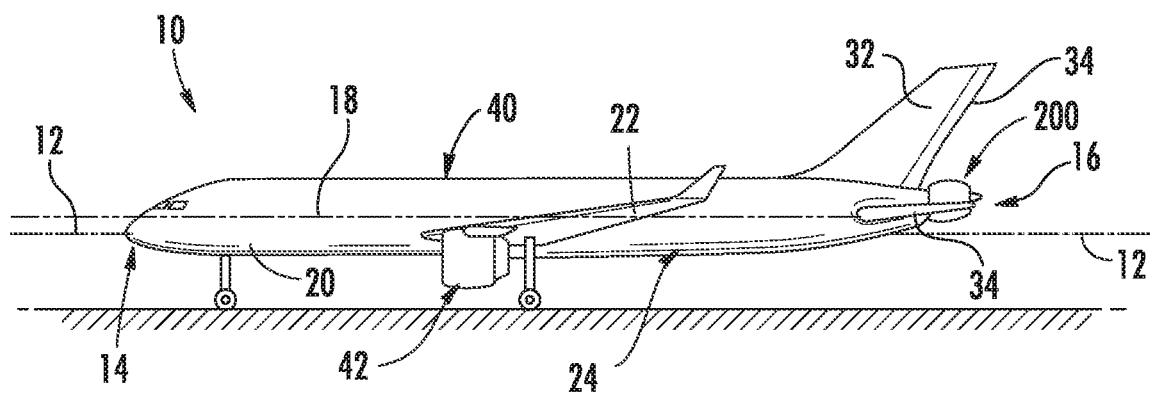
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. As shown in FIGS. 1 and 2 collectively, the aircraft 10 defines a longitudinal centerline 12 that extends therethrough, a vertical direction V, a lateral direction L, a forward end 14, and an aft end 16. Moreover, the aircraft 10 defines a mean line 18 extending between the forward end 14 and aft end 16 of the aircraft 10. As used herein, the "mean line" refers to a midpoint line extending along a length of the aircraft 10, not taking into account the appendages of the aircraft 10 (such as the wings 22 and stabilizers discussed below).

Moreover, the aircraft 10 includes a fuselage 20, extending longitudinally from the forward end 14 of the aircraft 10 towards the aft end 16 of the aircraft 10, and a pair of wings 22. The first of such wings 22 extends laterally outwardly with respect to the longitudinal centerline 12 from the port side 24 of the fuselage 20 and the second of such wings 22 extends laterally outwardly with respect to the longitudinal centerline 12 from a starboard side 26 of the fuselage 20. Each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

The exemplary aircraft 10 of FIGS. 1 and 2 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Additionally, the propulsion system includes an aft engine 200 mounted to the fuselage 20 of the aircraft 10 proximate the aft end 16 of the aircraft 10, or more particularly at a location aft of the wings 22 and aircraft engines 42, 44. The exemplary aft engine 200 is mounted to the fuselage 20 of the aircraft 10 such that the mean line 18 extends therethrough. However, in other exemplary embodiments, the aft engine 200 may instead be, e.g., blended with the fuselage 20, or otherwise incorporated into the fuselage 20, at the aft end 16.

Further, for the exemplary embodiment depicted, the propulsion system includes an electric communication bus 46, depicted in phantom in FIG. 1, electrically connecting one or more components of the first and/or second aircraft engines 42, 44 to the aft engine 200. The electric communication bus 46 may include one or more electric energy storage units or battery packs 48, power controllers 50, etc. The aft engine 200 and electric communication bus 46 will be discussed in greater detail below with reference to FIGS. 4 through 7.

Figure 3:
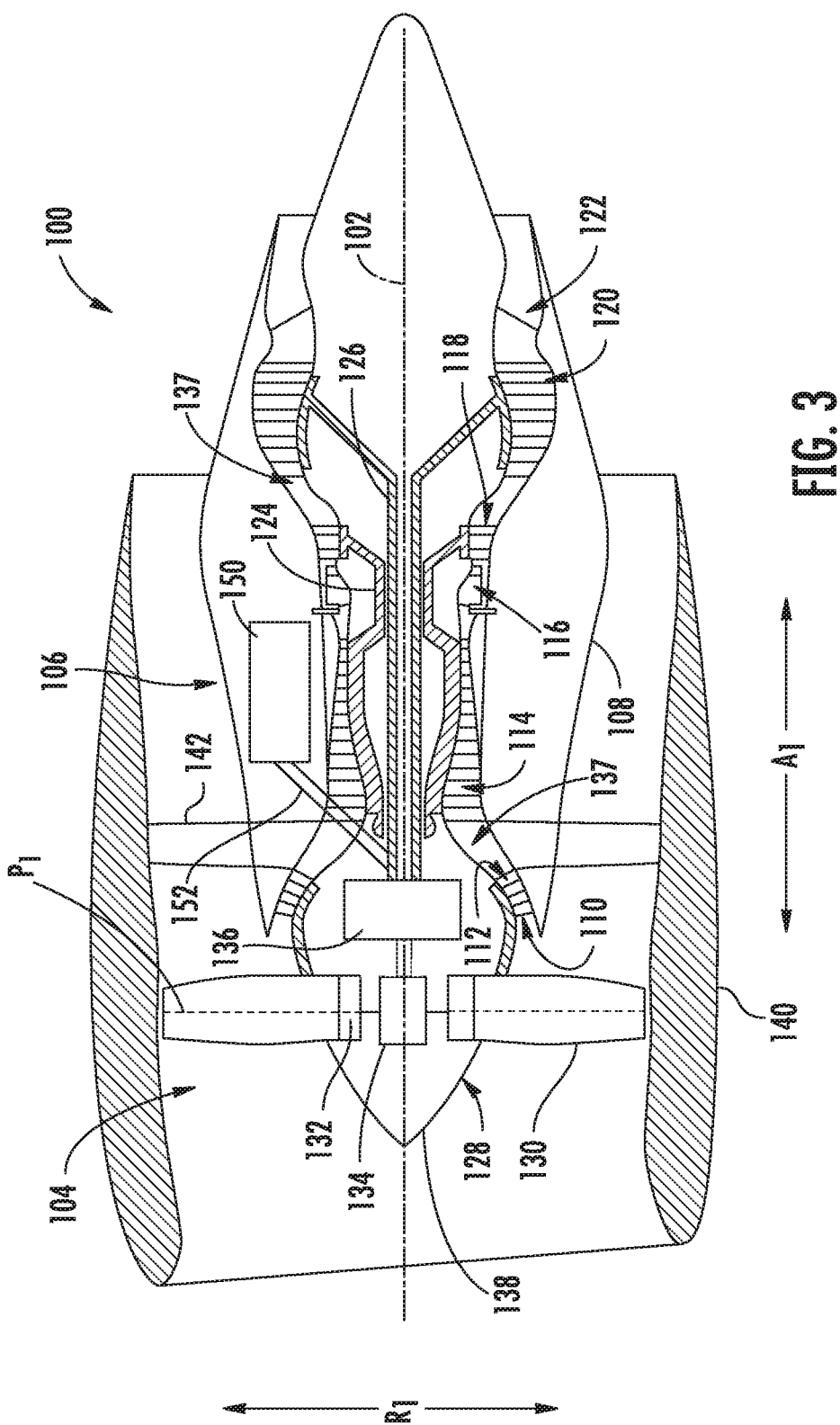
FIG. 3 is a schematic, cross-sectional view of a gas turbine engine in accordance with an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3.

As shown in FIG. 3, the turbofan engine 100 defines an axial direction A1 (extending parallel to a longitudinal centerline 102 provided for reference) and a radial direction R1. In general, the turbofan engine 100 includes a fan section 104 and a turbomachine 106 disposed downstream from the fan section 104.

The exemplary turbomachine 106 depicted generally includes a substantially tubular outer casing 108 that defines an angular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112. The compressor section, combustion section 116, turbine section, and nozzle section 122 together define a core air flowpath 137.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction R the. Each fan blade 130 is rotatable relative to the disk 132 about a pitch axis P1 by virtue of the fan blades 130 being operatively coupled to a suitable actuation member 134 configured to collectively vary the pitch of the fan blades 130 in unison. The fan blades 130, disk 132, and actuation member 134 are together rotatable about the longitudinal centerline 102 by LP shaft 126 across a power gear box 136. The power gear box 136 includes a plurality of gears for adjusting the rotational speed of the fan 128 relative to the LP shaft 126 to a more efficient rotational fan speed.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an angular fan casing or outer nacelle 140 that circumferentially surrounds the fan 128 and/or at least a portion of the turbomachine 106. It should be appreciated that the nacelle 140 may be configured to be supported relative to the turbomachine 106 by a plurality of circumferentially-spaced outlet guide vanes 142. Moreover, a downstream section 144 of the nacelle 140 extends over an outer portion of the turbomachine 106 so as to define a bypass airflow passage 146 therebetween.

Notably, it will be appreciated that the exemplary turbofan engine 100 further includes an electric machine 150 mechanically coupled to one or more rotating components of the turbomachine 106. More specifically, for the embodiment depicted, the electric machine 150 is housed within the outer casing 108 of the turbomachine 106 and is mechanically coupled through an extension 152 to the LP shaft 126. However, in other embodiments, the electric machine 150 may instead be rotatably coupled to any other suitable rotating components of the turbofan engine 100 in any other suitable manner. For example, in other embodiments, the electric machine 150 may be centerline mounted at a location inward of the core air flowpath 37 within, e.g., the turbine section of the turbomachine 106. In at least certain exemplary aspects, the electric machine 150 may act as an electric generator such that an additional amount of power may be extracted from the turbomachine 106 during operation and converted to electrical power for use, e.g., by a propulsion system of an aircraft incorporating the turbofan engine 100 (see FIGS. 1 and 2), by various systems of the aircraft incorporating the turbofan engine 100, etc. However, in other exemplary embodiments, the electric machine 150 may further act as an electric motor, e.g., adding rotational energy to the turbofan engine 100.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines. Additionally, in other exemplary embodiments, the turbofan engine 100 may have any suitable geared or direct drive configuration, variable pitch or fixed pitch fan, etc. Further, in still other embodiments, the turbofan engine 100 may instead be configured as any other suitable turbine engine, such as any suitable turboprop engine, turbojet engine, turboshaft engine, etc.

Figure 4:
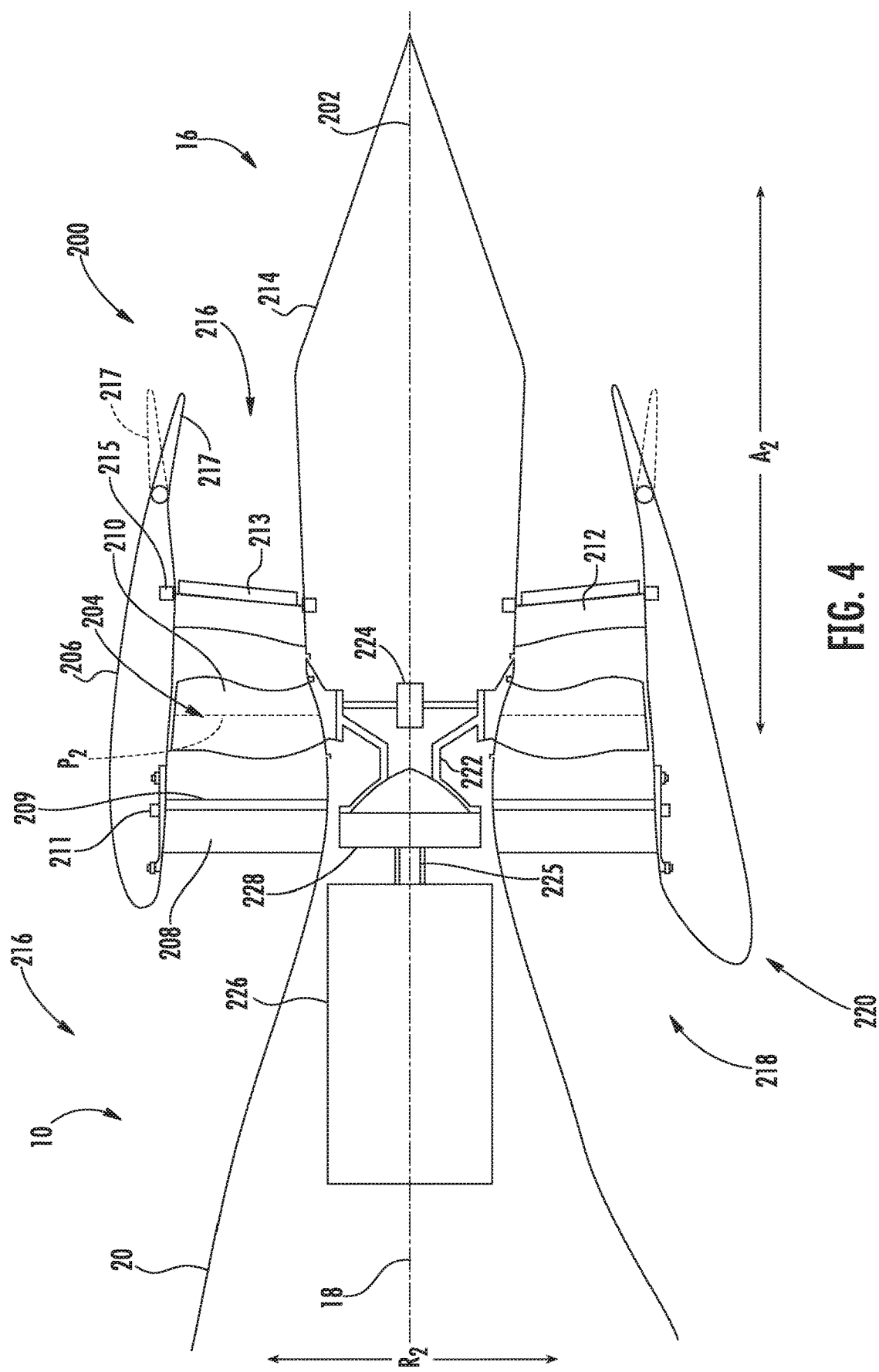
FIG. 4 is a close-up, schematic, cross-sectional view of an aft end of the exemplary aircraft of FIG. 1.

Referring now to FIG. 4, a close-up view is provided of the aft end 16 of the exemplary aircraft 10 described above with reference to FIGS. 1 and 2. As discussed above, the fuselage 20 of the aircraft 10 extends generally from the forward end 14 of the aircraft 10 towards the aft end 16 of the aircraft 10, with the aft engine 200 mounted to the fuselage 20 proximate the aft end 16 of the aircraft 10. Additionally, the aft engine 200 depicted defines an axial direction A2 extending along a longitudinal centerline axis 202 that extends therethrough for reference, a radial direction R2, and a circumferential direction C2 (see FIG. 5).

Notably, for the embodiment depicted, the aft engine 200 is configured as a boundary layer ingestion engine configured to ingest and consume air forming a boundary layer over the fuselage 20 of the aircraft 10. Specifically for the embodiment depicted, the aft engine 200 is configured as a boundary layer ingestion fan mounted to the fuselage 20 of the aircraft 10 at the aft end 16 of the aircraft 10.

The aft engine 200 includes a fan 204 rotatable about the centerline axis 202, a nacelle 206 extending around a portion of the fan 204, and one or more structural members 208 extending between the nacelle 206 and the fuselage 20 of the aircraft 10. The fan 204 includes a plurality of fan blades 210 spaced generally along the circumferential direction C2 (see FIG. 6). Additionally, the nacelle 206 extends around and encircles the plurality of fan blades 210. Specifically, the nacelle 206 extends around at least a portion of the fuselage 20 of the aircraft 10 when, as in FIG. 5, the aft engine 200 is mounted to the aircraft 10.

Referring still to FIG. 4, the one or more structural members 208 extend between the nacelle 206 and the fuselage 20 of the aircraft 10 at a location forward of the plurality of fan blades 210. The one or more structural members 208 for the embodiment depicted extend substantially along the radial direction R2 for the embodiment depicted, between the nacelle 206 and the fuselage 20 of the aircraft 10 for mounting the aft engine 200 to the fuselage 20 of the aircraft 10. It should also be appreciated, however, that in other exemplary embodiments the one or more structural members 208 may instead extend substantially along the axial direction A2, or in any other suitable direction between the axial and radial directions A2, R2.

The one or more structural members 208 depicted are configured as inlet guide vanes for the fan 204, such that the one or more structural members 208 are shaped and oriented to direct and condition a flow of air into the aft engine 200 to increase an efficiency of the aft engine 200. In certain exemplary embodiments, the one or more structural members 208 may be configured as fixed inlet guide vanes extending between the nacelle 206 and the fuselage 20 of the aircraft 10. However, for the embodiment shown, the structural members 208/inlet guide vanes are configured as variable inlet guide vanes moveable to change an airflow direction of an airflow provided to the fan 204. Specifically, for the embodiment depicted, the variable inlet guide vanes each include a tail 209 pivotable about an axis (not shown) extending generally along the radial direction R2 to provide such function. Further, one or more actuators 211 are positioned within the nacelle 206 operable with the tail 209 of each variable inlet guide vane to pivot the respective tails 209 in the manner described herein. Notably, however, in other embodiments, any other suitable variable structure may be provided for the structural members 208/variable inlet guide vanes.

Moreover, the exemplary aft engine 200 depicted further includes one or more outlet guide vanes 212 and a tail cone 214. The one or more outlet guide vanes 212 for the embodiment depicted extend between the nacelle 206 and the tail cone 214 for, e.g., adding strength and rigidity to the aft engine 200, as well as for directing a flow of air through the aft engine 200. The outlet guide vanes 212 may be evenly spaced along the circumferential direction C2 (see FIG. 5), or may have any other suitable spacing. Additionally, in certain embodiments, the outlet guide vanes 212 may be fixed outlet guide vanes. However, for the embodiment shown, the outlet guide vanes 212 are also configured as variable outlet guide vanes 212 moveable to change an airflow direction of an airflow from the fan 204. Specifically, for the embodiment depicted, the outlet guide vanes 212 each include a tail 213 pivotable about an axis (not shown) extending generally along the radial direction R2 to provide such function. Further, one or more actuators 215 are positioned within the nacelle 206 operable with the tail 213 of each variable outlet guide vanes 212 to pivot the respective tails 213 in the manner described herein. Notably, however, in other embodiments, any other suitable variable structure may be provided for the outlet guide vanes 212.

Aft of the plurality of fan blades 210, and for the embodiment depicted, aft of the one or more outlet guide vanes 212, the aft engine 200 additionally defines a nozzle 216 between the nacelle 206 and the tail cone 214. The nozzle 216 may be configured to generate an amount of trust from the air flowing therethrough, and the tail cone 214 may be shaped to minimize an amount of drag on the aft engine 200. However, in other embodiments, the tail cone 214 may have any other shape and may, e.g., end forward of an aft end of the nacelle 206 such that the tail cone 214 is enclosed by the nacelle 206 at an aft end. Additionally, in other embodiments, the aft engine 200 may not be configured to generate any measureable amount of thrust, and instead may be configured to ingest air from a boundary layer of air of the fuselage 20 of the aircraft 10 and add energy/speed up such air to reduce an overall drag on the aircraft 10 (and thus increase a net thrust of the aircraft 10).

Briefly, it will further be appreciated that for the embodiment depicted, the nozzle 216 is a variable area nozzle. More specifically, for the embodiment depicted, the nacelle 206 includes tail flaps 217 pivotable between an inner position (shown) and an outer position (depicted in phantom). The nozzle 216 may define a relatively small cross-sectional area when the tail flaps 217 are in the inner position, and a relatively large cross-sectional area when the tail flaps 217 are in the outer position. The aft engine 200 may be capable of producing more thrust when the tail flaps 217 are in the inner position, as compared to when the tail flaps 217 are in the outer position. It will be appreciated, however, that in other embodiments, any other suitable variable structure may be provided for the nacelle 206 and/or tail cone 214 to define the variable area nozzle 216 described herein.

Figure 5:
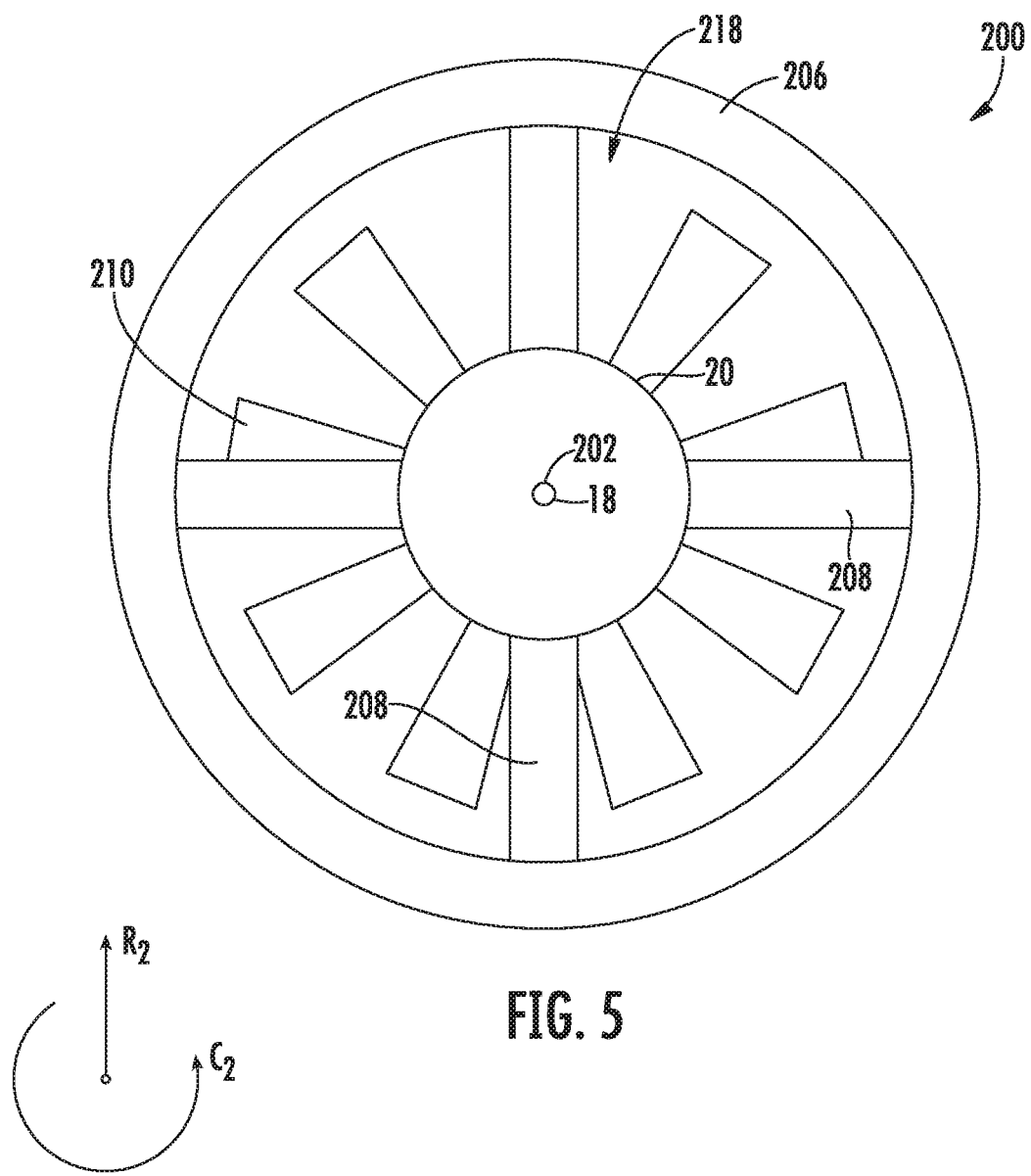
FIG. 5 is a cross-sectional view of an inlet of the exemplary aft engine of FIG. 4 taken along a centerline axis of the exemplary aft engine of FIG. 4.

Referring still to FIG. 4, and now briefly to FIG. 5, providing a view along the central axis 202 of the aft engine 200, the aft engine 200, or rather the nacelle 206, defines an inlet 218 at a forward end 220 of the nacelle 206 (FIG. 4). The inlet 218 is defined by the nacelle 206 with the fuselage 20, i.e., between the nacelle 206 and the fuselage 20. As mentioned above, the nacelle 206 of the aft engine 200 extends around and surrounds the plurality of fan blades 210 of the fan 204 of the aft engine 200. For the embodiment depicted, nacelle 206 also extends at least partially around the central axis 202 of the aft engine 200, and at least partially around the mean line 18 of the aircraft 10. Specifically, for the embodiment depicted, the nacelle 206 extends substantially three hundred and sixty degrees (360°) around the central axis 202 of the aft engine 200, and substantially three hundred and sixty degrees (360°) around the mean line 18 of the aircraft 10.

Referring still to FIG. 4, the fan 204 further includes a fan shaft 222 with the plurality of fan blades 210 attached thereto. Although not depicted, the fan shaft 222 may be rotatably supported by one or more bearings located forward of the plurality of fan blades 210 and, optionally, one or more bearings located aft of the plurality of fan blades 210. Such bearings may be any suitable combination of roller bearings, ball bearings, thrust bearings, etc.

For the embodiment depicted, the fan 204 further includes a pitch change mechanism 224, and each of the plurality of fan blades 210 define a pitch axis P2. The pitch change mechanism 224 is configured to rotate each of the plurality of fan blades 210 about its respective pitch axis P2, e.g., in unison. Such operation of the pitch change mechanism 224 and rotation of the plurality of fan blades 210 about their respective pitch axes P2 will be described in greater detail below with regard to FIGS. 6 and 7.

The fan 204 further includes an electric machine 226, and for the embodiment depicted, a gearbox 228. For the embodiment depicted, the electric machine 226 is at least partially positioned within the fuselage 20 of the aircraft 10, and the fan shaft 222 and fan 204 are mechanically coupled to the electric machine 226. More specifically, for the embodiment depicted, the fan shaft 222 and fan 204 are mechanically coupled to the electric machine 226 through the gearbox 228. The gearbox 228 may be configured to modify a rotational speed of the electric machine 226, or rather of a shaft 225 of the electric machine 226, such that the fan 204 of the aft engine 200 rotates at a desired rotational speed. The gearbox 228 may be a fixed ratio gearbox, or alternatively, the gearbox 228 may define a variable gear ratio. Alternatively, in other embodiments, the aft engine 200 may not include a gearbox, and instead, the electric machine 226 may directly drive the fan 204.

Additionally, it will be appreciated that although the exemplary electric machine 226 is depicted positioned partially within the fuselage 20 of the aircraft 10, in certain exemplary embodiments, the electric machine 226 may alternatively be positioned at any other suitable location within, e.g., the fuselage 20 of the aircraft 10 or the aft engine 200, or within the aft engine 200.

In at least certain embodiments, such as the exemplary embodiment depicted, the electric machine 226, or rather the aft engine 200, may be incorporated into a hybrid electric propulsion system, such as the exemplary propulsion system described above with reference to, e.g., FIGS. 1 through 3. For example, the propulsion system may have one or more gas turbine engines, such as the exemplary aircraft engines 42, 44 of FIGS. 1 and 2 and/or the exemplary turbofan engine 100 of FIG. 3. The gas turbine engines may be configured to rotate an electric generator (such as the electric generator 150 of FIG. 3) to generate electrical power during operation. The electrical power may be provided directly, or indirectly through e.g., one or more electric energy storage units, to the electric machine 226 of the aft engine 200 (see the exemplary electric communication bus 46 of FIG. 1 optionally including one or more electric energy storage units 48 and power controllers 50). Such electrical power may be utilized to power the electric machine 226, such that the electric machine 226 may drive the plurality of fan blades 210 of the fan 204.

As will be more fully appreciated from the description below, the electric machine 226 is configured as an electric motor/generator. In such a manner, when the electric machine 226 receives electrical power from, e.g., a power source within a hybrid electric propulsion system, the electric machine 226 may convert such electrical power received to mechanical power transferred to the fan 204. By contrast, during other operations, the electric machine 226 may be configured to convert mechanical power from the fan 204 (e.g., generated from an airflow through the fan 204) to electrically power, e.g., one or more components of the hybrid electric propulsion system, one or more aircraft systems, or both.

More specifically, the aft engine 200 may be configured to operate such that the electric machine 226 drives the fan 204 during certain operations, and is driven by the fan 204 during other operations to generate electrical power. For example, the aft engine 200 may be configured to operate such that the electric machine 226 drives the fan 204 during various forward thrust operations (e.g., take off and cruise operations), and may be configured to operate such that the electric machine 226 is driven by the fan 204 to generate electrical power during various emergency operations.

Figure 6:
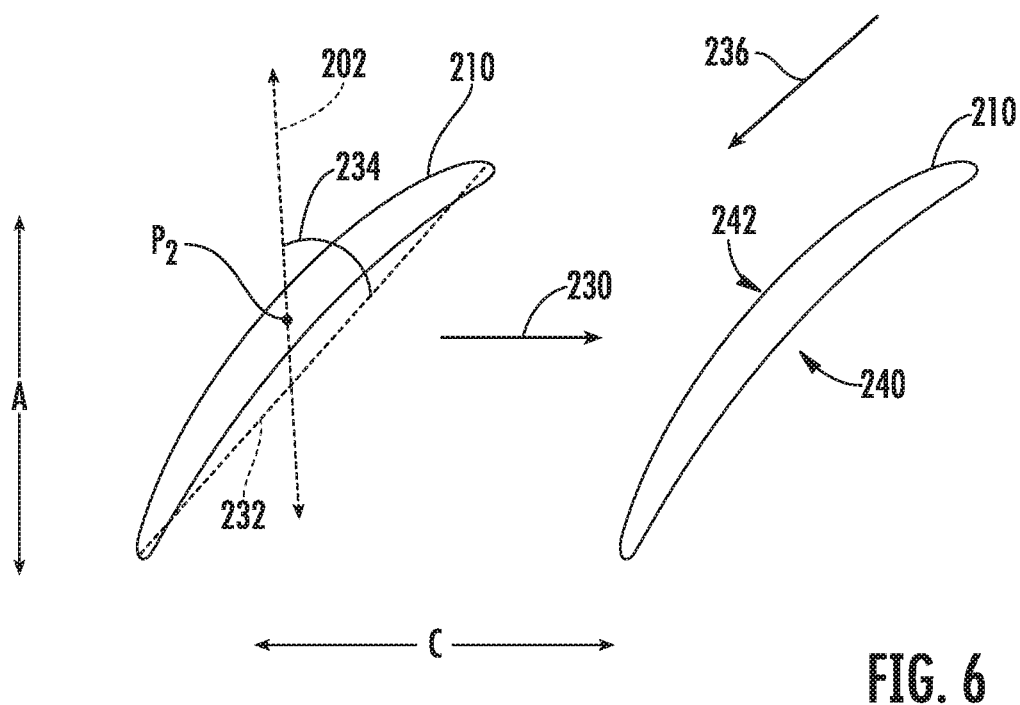
FIG. 6 is a plan view of a plurality of fan blades of the exemplary aft engine of FIG. 4.

For example, referring particularly to FIG. 6, a schematic, plan view is provided of a plurality of fan blades 210 of the fan 204 of the exemplary aft engine 200 of FIG. 4. For the embodiment of FIG. 6, the plurality of fan blades 210 may be rotated in a first circumferential direction 230 by the electric machine 226, such that they generate a forward thrust for the aircraft 10. As will be appreciated, the plurality of fan blades 210 depicted in FIG. 6 are in a first angular position, and more specifically are in a positive angular position. Notably, each of the plurality of fan blades 210 defines a chord line 232, and as used herein, the angular position of the fan blades 210 refers to an angle of the chord line 232 of the fan blades 210 relative to the central axis 202, more specifically referred to herein as a pitch angle 234. In such a manner, it will be appreciated that the angular position of the fan blades 210 characterizes the pitch angle 234 of the fan blades 210. Accordingly, when in the positive angular position, the fan blades 210 may define a pitch angle 234 of between about fifteen (15) degrees and about seventy-five (75) degrees, such as between about twenty-five (25) degrees and about sixty-five (65) degrees.

Notably, the pitch angle 234 of the plurality of fan blades 210 may be modified using the pitch change mechanism 224 of the fan 204 by rotating the fan blades 210 about their respective pitch axes P2 (see also FIG. 4). Further, it will be appreciated that the pitch angle 234 of the plurality of fan blades 210 may be selected based on, e.g., a rotational speed of the plurality of fan blades 210 of the fan 204, an airspeed of the aircraft 10, or both. In such a manner, the pitch angle 234 of the plurality of fan blades 210 may be selected such that a relative velocity of an airflow through the fan 204 is substantially in alignment with the chord line 232 of each fan blade 210 of the plurality of fan blades 210. For example, it will be appreciated that the relative velocity, indicated by arrow 236 in FIG. 6, includes an axial component and a circumferential component, with a magnitude of the axial component and the circumferential component being influenced by the rotational speed of the plurality of fan blades 210 and the airspeed of the aircraft 10. By substantially aligning the relative velocity with the chord lines 232 of the plurality of fan blades 210, forces on the plurality of fan blades 210 may be minimized during operation.

In at least certain exemplary embodiments, one or more engines of the aircraft propulsion system may fail (e.g., aircraft engines 42, 44 of the propulsion system of the exemplary aircraft 10 of FIGS. 1 and 2), such that such engines are not capable of generating electrical power for the aircraft 10. In such a scenario, the aft engine 200 may be capable of generating a desired amount of electrical power to power one or more aircraft systems (e.g., flight controls, environmental systems, etc.). It will be appreciated, that with such a configuration, the aircraft 10 may therefore need not include a separate ram air turbine for providing such functionality.

Figure 7:
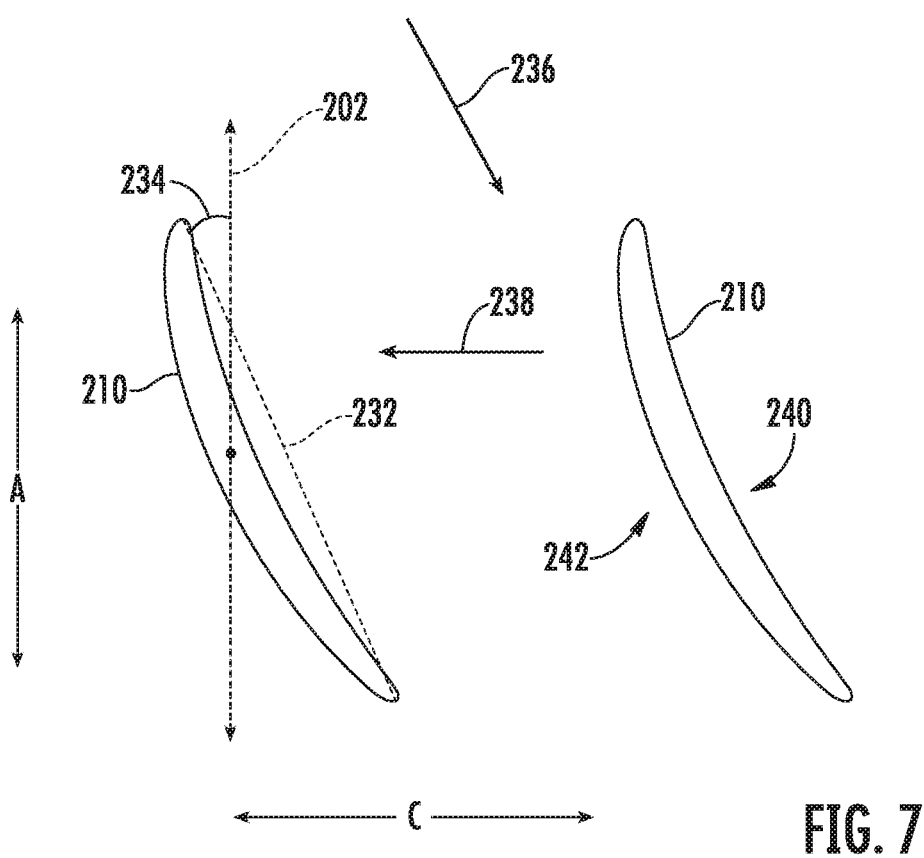
FIG. 7 is another plan view of the plurality of fan blades of the exemplary aft engine of FIG. 4.

More specifically, referring now particularly to FIG. 7, a schematic, plan view is provided of the plurality of fan blades 210 of FIG. 6 in a second angular position. For the embodiment depicted, the second angular position is a negative angular position. More specifically, when the plurality of fan blades 210 are in the second, negative angular position, each of the plurality of fan blades 210 defines a negative pitch angle 234 with the central axis 202 of the fan 204. For example, when in the negative angular position, the fan blades 210 may define a pitch angle 234 of between about negative five (−5) degrees and about negative sixty (−60) degrees, such as between about negative ten (−10) degrees and negative forty-five (−45) degrees. In such a manner, it will be appreciated that the positive angular position of the plurality fan blades 210 and the negative angular position of the plurality of fan blades 210 together define an angular difference of at least about twenty (20) degrees and up to about one hundred ten (110) degrees. However, in other embodiments, the positive angular position of the plurality of fan blades 210 and negative angular position of the plurality of fan blades 210 may instead define any other suitable angular difference.

When the plurality of fan blades 210 are in the negative angular position, the plurality of fan blades 210 may be rotated in a second circumferential direction 238, opposite the first circumferential direction 230. More specifically, it will be appreciated that each of the plurality of fan blades 210 generally defines a pressure side 240 and a suction side 242. Without the electric machine 226 driving the plurality of fan blades 210 towards the pressure side 240 (i.e., the first circumferential direction 230 for the embodiment shown; see FIG. 6), the plurality of fan blades 210 will generally be urged to rotate towards the suction side 242 (i.e., the second circumferential direction 238 for the embodiment shown; see FIG. 7) by virtue of a pressure differential across the pressure side 240 and suction side 242.

Moreover, the electric machine 226 of the fan 204 may be switched from an electric motor mode to an electric generator mode. Such may be accomplished in any suitable manner. For example, in certain exemplary aspects, the electric machine 226 may shift its phase. In such a manner, airflow through the fan 204 may rotate the plurality of fan blades 210 in the second circumferential direction 238, and the plurality of fan blades 210 may in turn drive the electric machine 226, configured as an electric generator, such that the electric machine 226 generates electrical power for the propulsion system and/or aircraft 10 incorporating the propulsion system.

Notably, in at least certain exemplary and aspects, the failure condition which may trigger the aft engine 200 to generate electrical power may eliminate with it certain power reserves necessary for moving the plurality of fan blades 210 from the first angular position to the second angular position. For example, the pitch change mechanism 224 may be an electrically actuated pitch change mechanism (or a hydraulic or pneumatic pitch change mechanism powered by an electric pump). In such a case, as will be appreciated from the discussion above, the pressure differential from the pressure sides 240 of the plurality of fan blades 210 to the suction sides 242 of the plurality of fan blades 210 may still cause the fan 204 to rotate in the second circumferential direction 238 (albeit not as efficiently as when the plurality of fan blades 210 are in the second angular position), driving the electric motor 226, configured as an electric generator. Such may generate an initial amount of electrical power. The initial amount of electrical power may then be used at least in part to move the plurality of fan blades 210 from the first angular position (FIG. 6) to the second angular position (FIG. 7).

Further, similar to the configuration above, the second angular position may be modified by, e.g., the pitch change mechanism 224, in response to, and based on, a rotational speed of the plurality of fan blades 210, an airspeed of the aircraft 10, or both. In such a manner, the pitch angle 234 of the plurality of fan blades 210 may be modified such that the chord line 232 of each fan blade 210 of the plurality of fan blades 210 is substantially aligned with a relative velocity 236 of the airflow through the fan 204 when the fan 204 is driving the electric machine 226 to generate electrical power.

Notably, it will be appreciated that operating the electric machine as an electric generator may act as a drag on the aircraft 10. Therefore, the aft fan 200 may also be used as an air brake during certain nonemergency operations to also generate electrical power.

It should be appreciated, however, that the exemplary aft engine 200 described herein is provided by way of example only. For example, in certain exemplary embodiments, the aft engine 200 may not include each of the variable geometry components described above, e.g., with reference to FIG. 4. For example, in other exemplary embodiments, one or more of the structural members 208/inlet guide vanes, fan blades 210 of the fan 204, outlet guide vanes 212, and the nacelle 206 having flaps 217 defining a variable area nozzle may be configured as fixed members.

Further, in other exemplary embodiments, the aft engine 200 may be operable in any other suitable manner to, e.g., generate electrical power in the event of a failure condition (or other operating mode in which it may be desirable to generate electrical power). For example, in certain exemplary embodiments, instead of changing a pitch angle 234 of the plurality of fan blades 210 in a manner such that the plurality of fan blades change rotational directions (i.e., from a first circumferential direction 230 a second circumferential direction 238) one or more other variable geometry components may be modified to allow for the fan 204 to windmill and rotate the electric machine 226 to generate electrical power. One or more these exemplary aspects described below with reference to, e.g., a method 400 of FIG. 9. Additionally, or alternatively, it will be appreciated that in other exemplary aspects, the pitch angle 234 of the plurality of fan blades 210 may be changed to change a direction of torque between the fan 204 and the electric machine 226, such as within the fan shaft 222 and electric machine shaft 225 for, e.g., the embodiment of FIG. 4. For example, when the electric machine 226 is driving the fan 204, the torque direction may be in the first circumferential direction 230 (FIG. 6) and when the fan 204 is driving the electric machine 226, the torque direction may be in the second circumferential direction 238 (FIG. 7). The change in torque directions may be accomplished at least in part due to the change in pitch angles 234.

Figure 8:
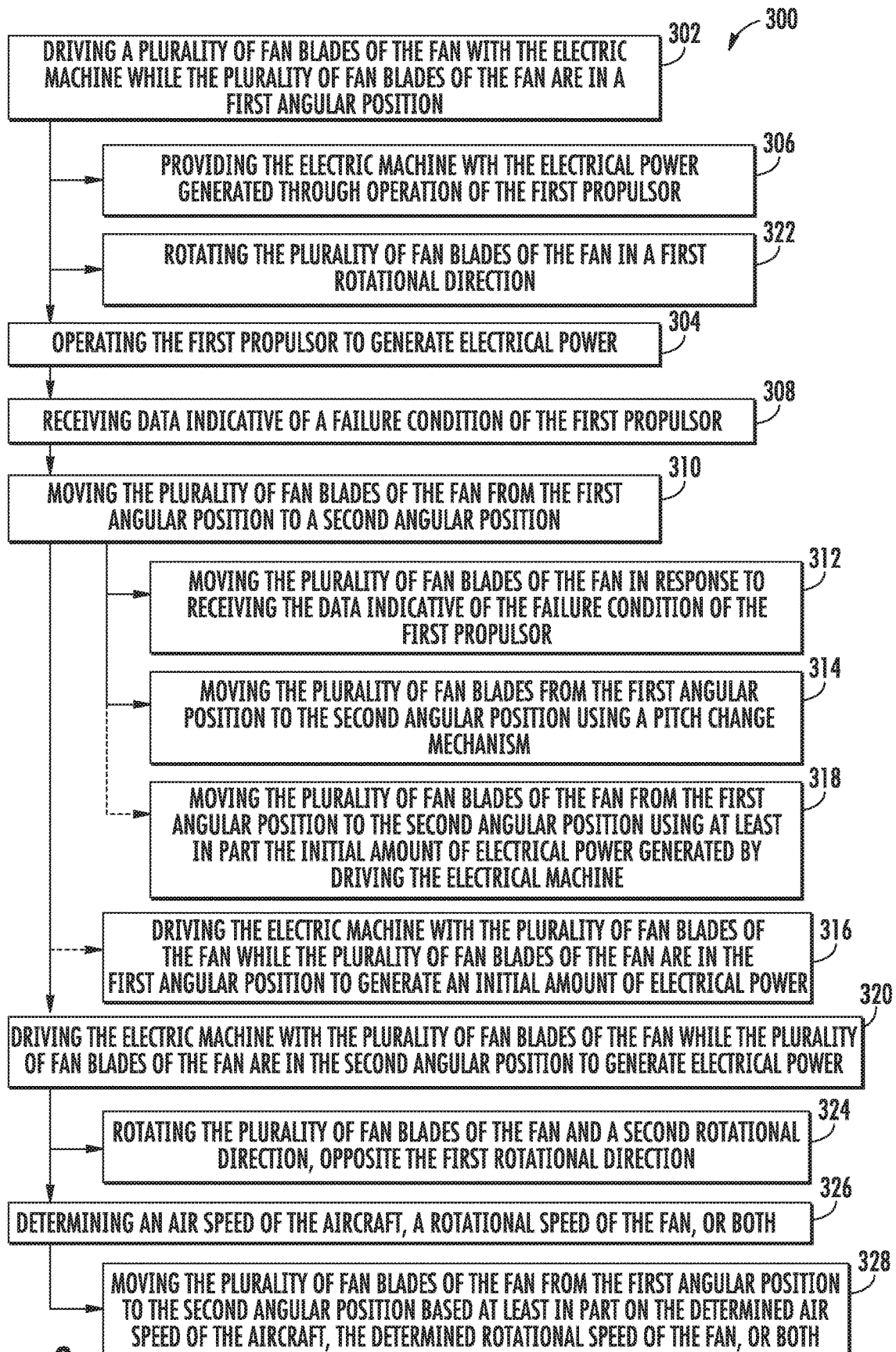
FIG. 8 is a flow diagram of a method for operating an electric fan of an aircraft propulsion system in accordance with an exemplary aspect of the present disclosure.

Referring now to FIG. 8, a method 300 for operating a fan of an aircraft propulsion system in accordance with an exemplary aspect of the present disclosure is provided. Notably, the exemplary aircraft propulsion system operated by the method 300 may be configured in substantially the same manner as one or more of the exemplary embodiments described above with reference to FIGS. 1 through 7. Accordingly, the fan may be an aft fan mounted at an aft end of a fuselage of an aircraft.

The method 300 generally includes driving a plurality of fan blades of the electric fan with an electric machine to generate thrust for the aircraft, and more specifically includes at (302) driving a plurality of fan blades of the fan with the electric machine while the plurality of fan blades of the fan are in a first angular position. In at least certain embodiments, the first angular position is a positive angular position. More specifically, it will be appreciated that the fan defines a central axis and that each fan blade of the plurality of fan blades defines a positive angle with the central axis when the plurality of fan blades are in the positive angular position.

Moreover, in at least certain exemplary aspects, the aircraft propulsion system may further include a first propulsor. For example, the first propulsor may be a gas powered propulsor, such as a gas turbine engine, such as a turbofan jet engine. Referring still to the exemplary aspect of FIG. 8, the method 300 further includes at (304) operating the first propulsor to generate electrical power. With such an exemplary aspect, driving the plurality of fan blades with the electric machine (302) further includes at (306) providing the electric machine with the electrical power generated through operation of the first propulsor at (304).

Further, for the exemplary aspect depicted, the method 300 includes at (308) receiving data indicative of a failure condition of the first propulsor. In such a manner, the method 300 may no longer be capable of operating the first propulsor to generate electrical power for the propulsion system and/or an aircraft incorporating the propulsion system. Accordingly, the fan of the aircraft propulsion system may be operated in an electric power generation mode.

More specifically, the method 300 includes at (310) moving the plurality of fan blades of the fan from the first angular position to a second angular position, and more specifically, for the exemplary aspect depicted, moving the plurality of fan blades of the fan at (310) includes at (312) moving the plurality of fan blades of the fan in response to receiving the data indicative of the failure condition of the first propulsor at (308). The second angular position is a negative angular position. In such a manner, each fan blade of the plurality of fan blades defines a negative angle with the central axis when the plurality of fan blades are in the negative angular position. In at least certain exemplary aspects, the positive angular position and negative angular position together define an angular difference of at least about 20 degrees and up to about 110 degrees.

For the exemplary aspect depicted, moving the plurality of fan blades from the first angular position to the second angular position at (310) includes at (314) moving the plurality of fan blades from the first angular position to the second angular position using a pitch change mechanism. The pitch change mechanism may be operated using a stored amount of electrical power, a stored amount of hydraulic power, and/or a stored amount of pneumatic power.

It will be appreciated, however, that in at least certain exemplary aspects, the propulsion system and/or aircraft incorporating the propulsion system may not have a sufficient amount of stored power to move the plurality of fan blades from the first angular position to the second angular position with the pitch change mechanism at (314). Accordingly, with such an exemplary aspect, as is depicted in phantom in FIG. 8, the method 300 may further include at (316) driving the electric machine with the plurality of fan blades of the fan while the plurality of fan blades of the fan are in the first angular position to generate an initial amount of electrical power. With such an exemplary aspect, as is also depicted in phantom in FIG. 8, moving the plurality of fan blades of the fan from the first angular position to the second angular position at (310) may further include at (318) moving the plurality of fan blades of the fan from the first angular position to the second angular position using at least in part the initial amount of electrical power generated by driving the electric machine at (316).

Further, the method 300 includes driving the electric machine with the plurality of fan blades of the electric fan to generate electrical power subsequent to driving the plurality of fan blades of the electric fan with the electric machine to generate thrust for the aircraft. More specifically, the method 300 includes at (320) driving the electric machine with the plurality of fan blades of the fan while the plurality of fan blades of the fan are in the second angular position to generate electrical power. The electrical power generated at (320) may be provided to, e.g., other propulsors of the propulsion system, systems of the aircraft incorporating the propulsion system, etc. Further, it will be appreciated that given a structure of the fan blades (e.g., including a pressure side and a suction side), in at least certain exemplary aspects, driving the plurality of fan blades of the fan with the electric machine at (302) includes at (322) rotating the plurality of fan blades of the fan in a first rotational direction (i.e., a first circumferential direction). By contrast, driving the electric machine with the plurality of fan blades of the fan at (320) includes at (324) rotating the plurality of fan blades of the fan and a second rotational direction, opposite the first rotational direction (i.e., a second circumferential direction).

Further, it will be appreciated that the second angular position of the plurality of fan blades may be selected to maximize an efficiency of the fan. In such a manner, as is depicted, the method 300 further includes at (326) determining an air speed of the aircraft, a rotational speed of the fan, or both. For example, the fan may include one or more sensors for determining is rotational speed, the airspeed of the aircraft, or both. Alternatively, however, the fan may receive this data from other systems of the propulsion system and/or aircraft. Further, with such an exemplary aspect, moving the plurality of fan blades of the fan from the first angular position to the second angular position at (310) includes at (328) moving the plurality of fan blades of the fan from the first angular position to the second angular position based at least in part on the determined air speed of the aircraft, the determined rotational speed of the fan, or both at (326).

It will be appreciated, however, that the aft fan 200 discussed above with respect to FIGS. 1 through 7 and the method 300 discussed above with respect to FIG. 8 are provided by way of example only. In other exemplary aspects, the system and method of the present application may apply to any other electric fan (such as an electric fan mounted to a wing of the aircraft, a stabilizer of the aircraft, etc.). In such manner, the method 300 may instead be applied more generally to operate an electric fan (as opposed to simply an aft fan). Further, in other exemplary aspects, the system and method of the present application may apply to a fixed-pitch electric fan (such as an aft fan), or may otherwise be capable of operating to drive the electric machine without substantially changing a pitch angle. In such a manner, the method 300 may instead include, e.g., at (302) driving a plurality of fan blades of the electric fan with an electric machine to generate thrust for the aircraft, and at (320) driving the electric machine with the plurality of fan blades of the electric fan to generate electrical power subsequent to driving the plurality of fan blades of the electric fan with the electric machine to generate thrust for the aircraft. Further, with such an exemplary aspect, the method may not include, e.g., moving the plurality of fan blades at (310).

Figure 9:
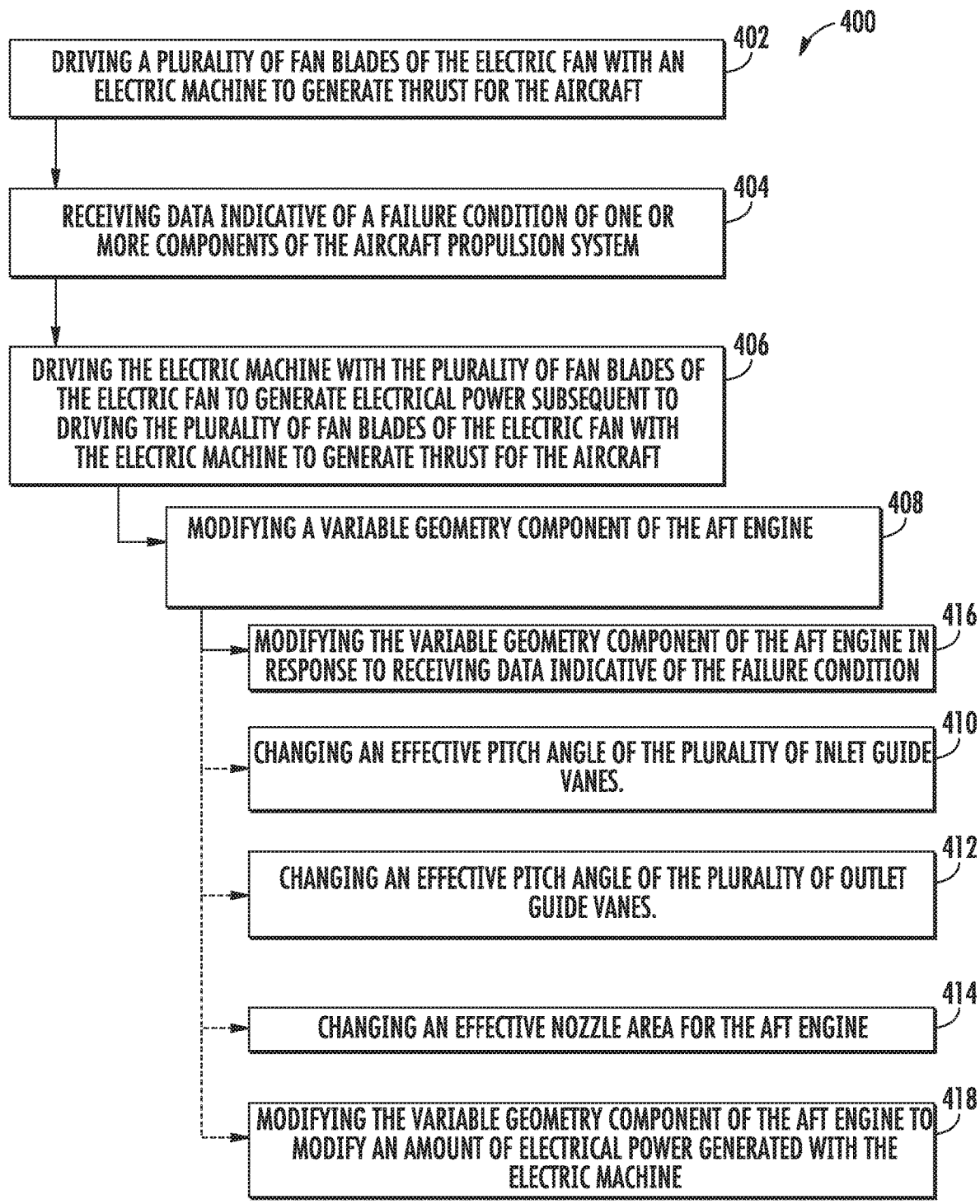
FIG. 9 is flow diagram of a method for operating a fan of an aircraft propulsion system in accordance with another exemplary aspect of the present disclosure.

Referring now to FIG. 9, a method 400 for operating a fan of an aircraft propulsion system in accordance with another exemplary aspect of the present disclosure is provided. Notably, the exemplary aircraft propulsion system operated by the method 400 may be configured in substantially the same manner as one or more of the exemplary embodiments described above with reference to FIGS. 1 through 7. Accordingly, the fan may be an aft fan (or rather, a fan of an aft engine) mounted at an aft end of a fuselage of an aircraft.

The method 400, similar to the exemplary method 300 described above with reference to FIG. 8, generally includes at (402) driving a plurality of fan blades of the electric fan with an electric machine to generate thrust for the aircraft. Although not depicted, the method 400 may further include operating a first propulsor to generate electrical power and providing the electric machine with the electrical power generated through operation of the first propulsor, e.g., to drive the plurality of fan blades of the fan with the electric machine at (402).

Further, the method 400 includes at (404) receiving data indicative of a failure condition of one or more components of the aircraft propulsion system, and at (406) driving the electric machine with the plurality of fan blades of the electric fan to generate electrical power subsequent to driving the plurality of fan blades of the electric fan with the electric machine to generate thrust for the aircraft at (402). Driving the electric machine with the plurality of fan blades of the electric fan at (406) may include driving the electric machine with the plurality of fan blades of the electric fan response to receiving data indicative of the failure condition at (402). Notably, however, in other exemplary aspects, driving the electric machine with the plurality of fan blades of the electric fan at (406) may include driving the electric machine with the plurality of fan blades of the electric fan for any other suitable purpose, or in response to any other suitable command (e.g., in response to an air-braking command, a windmilling command, etc.).

Further, for the exemplary aspect depicted in FIG. 9, driving the electric machine with the plurality of fan blades of the electric fan at (406) includes at (408) modifying a variable geometry component of the aft engine. For example, in certain exemplary aspects, the aft engine may include one or more variable inlet guide vanes. With such an exemplary aspect, modifying the variable geometry component of the aft engine at (408) may include at (410) changing an effective pitch angle of the plurality of inlet guide vanes. Additionally, or alternatively, in other exemplary aspects, the aft engine may include one or more variable outlet guide vanes. With such an exemplary aspect, modifying the variable geometry component of the aft engine at (408) may include at (412) changing an effective pitch angle of the plurality of outlet guide vanes. Additionally, or alternatively still, in still other exemplary aspects, the aft engine may define a variable area nozzle. The variable area nozzle may be defined by a nacelle having a variable geometry, e.g., at its aft end. For example, the nacelle may include a plurality of pivotable flaps moveable between, e.g., and inner position and an outer position, with the movement between the inner position and the outer position changing an effective nozzle area for the aft engine. With such an exemplary aspect, modifying the variable geometry component of the aft engine at (408) may include at (414) changing an effective nozzle area for the aft engine.

Further, for the exemplary aspect of the method 400 depicted, modifying the variable geometry component of the aft engine at (408) includes at (416) modifying the variable geometry component of the aft engine in response to receiving data indicative of the failure condition at (404).

Moreover, it will be appreciated that in one or more these exemplary aspects, modifying the variable geometry component of the aft engine at (408) may include changing the effective pitch angle of the plurality of inlet guide vanes, changing the effective pitch angle of the plurality of outlet guide vanes, and/or changing the effective nozzle area for the aft engine based on, e.g., a rotational speed of the plurality of fan blades, an airspeed of the aircraft including the aircraft propulsion system, an amount of electrical power to be produced, or a combination thereof. Additionally, in certain exemplary aspects, modifying the variable geometry component of the engine at (408) may include changing at least two variable geometry components (e.g., at least two of the inlet guide vanes, the outlet guide vanes, the effective nozzle area, and/or a fan pitch angle (see FIG. 8)). For example, by way of example, at least certain exemplary embodiments, driving the electric machine with the plurality of fan blades of the electric fan at (406) may include increasing a pitch angle of the outlet guide vanes and opening up the effective fan nozzle area to allow for the plurality of fan blades of the fan to rotate as freely as possible.

Additionally, in certain exemplary embodiments, the method 400 may be used in conjunction with aspects of the exemplary method 300 described above. Accordingly, in certain exemplary aspects, modifying the variable geometry component of the engine at (408) may further include changing a pitch angle of the plurality of fan blades of the fan and/or changing a rotational direction of the fan. Alternatively, however, in other exemplary aspects, the fan may be a fixed pitch fan, and/or driving the electric machine with the plurality of fan blades of the electric fan and modifying the variable geometry component of the engine may include maintaining a rotational direction of the fan.

Further, it will be appreciated that in one or more of the exemplary aspects described above, the electric machine driving the electric fan and being driven by the electric fan may be capable of producing differing amounts of electrical power when being driven by the electric fan. For example, the electric machine may be capable of producing differing amounts of electric power depending on the rotational speed of the electric fan. Accordingly, in at least certain exemplary aspects, driving the electric machine with the plurality of fan blades at (406) and/or at (320) may include producing electrical power with the electric machine at a power level of approximately 28 Volts direct current, generating electrical power at a level of approximately 115 Volts alternating current (e.g., at approximately 400 Hertz), generating electrical power at each of the foregoing power levels at differing times, or generating electrical power at any other two or more power levels. With such an exemplary aspect, modifying the variable geometry component of the aft engine at (408) may further include at (418) modifying the variable geometry component of the aft engine to modify an amount of electrical power generated with the electric machine.

It will be appreciated that the exemplary aspects described herein are by way of example only, and that in other exemplary aspects, the disclosure herein may be extended to other, e.g., propulsion systems and operating methods. For example, in other exemplary aspects, the methods described herein may be used to generate electricity (and drag on the aircraft) in response to a flight operating condition, instead of or in addition to a failure condition. For example, the methods may drive an electric machine in response to receiving data that the aircraft including the propulsion system is in a descent operating mode, which may have the dual benefit of generating electricity for the aircraft and generating a drag on the aircraft (to allow for an improved descent profile). In such a case, the method may modify one or more variable geometry components (e.g., guide vanes and/or propeller blade pitch angles, nozzle area, etc.) to generate a desired amount of electricity and/or drag. Further, in other exemplary embodiments, the exemplary aspects and methods described herein may apply to any electric fan or electric propulsor, and not only to a boundary layer ingestion electric fan. For example, the exemplary aspects and methods described herein may apply to an electric propulsor mounted to a wing, a fuselage (e.g., at an aft end of the aircraft or elsewhere), a stabilizer, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an electric fan of an aircraft propulsion system, the method comprising:
   driving a plurality of fan blades of the electric fan with an electric machine to generate thrust for the aircraft;
   receiving data indicative of a failure condition of one or more components of the propulsion system; and
   driving the electric machine with the plurality of fan blades of the electric fan to generate electrical power in response to receiving data indicative of the failure condition subsequent to driving the plurality of fan blades of the electric fan with the electric machine to generate thrust for the aircraft.

2. The method of claim 1, wherein the electric fan is an electric fan of an aft engine of the aircraft propulsion system, and wherein driving the electric machine with the plurality of fan blades of the electric fan to generate electrical power comprises modifying a variable geometry component of the aft engine.

3. The method of claim 2, wherein modifying the variable geometry component of the aft engine comprises changing at least one of an effective pitch angle of a plurality of variable inlet guide vanes of the aft engine, an effective pitch angle of a plurality of variable outlet guide vanes of the aft engine, or an effective nozzle area for the aft engine.

4. The method of claim 2, wherein modifying the variable geometry component of the aft engine comprises changing an effective pitch angle of a plurality of variable guide vanes of the aft engine.

5. The method of claim 2, wherein modifying the variable geometry component of the aft engine comprises an effective nozzle area for the aft engine.

6. The method of claim 2,
   wherein modifying the variable geometry component of the aft engine comprises modifying the variable geometry component of the aft engine in response to receiving data indicative of the failure condition.

7. The method of claim 2, wherein modifying the variable geometry component of the aft engine includes modifying the variable geometry component of the aft engine to modify an amount of electrical power generated with the electric machine.

8. The method of claim 1, wherein driving the plurality of fan blades of the electric fan with the electric machine comprises driving the plurality of fan blades of the electric fan with the electric machine while the plurality of fan blades of the electric fan are in a first angular position, and wherein driving the electric machine with the plurality of fan blades of the electric fan to generate electrical power comprises driving the electric machine with the plurality of fan blades of the electric fan to generate electrical power while the plurality of fan blades of the electric fan are in a second angular position.

9. The method of claim 8, wherein the first angular position is a positive angular position, and wherein the second angular position is a negative angular position.

10. The method of claim 9, wherein the positive angular position and the negative angular position define an angular difference of at least 20 degrees and up to 100 degrees.

11. The method of claim 8, further comprising:
moving the plurality of fan blades of the electric fan from the first angular position to the second angular position.

12. The method of claim 11, wherein the aircraft propulsion system further comprises a first propulsor, wherein the method further comprises:
receiving data indicative of a failure condition of the first propulsor, and wherein moving the plurality of fan blades of the electric fan comprises moving the plurality of fan blades of the electric fan in response to receiving the data indicative of the failure condition of the first propulsor.

13. The method of claim 11, further comprising:
determining an air speed of the aircraft, a rotational speed of the electric fan, or both, and wherein moving the plurality of fan blades of the electric fan from the first angular position to the second angular position comprises moving the plurality of fan blades of the electric fan from the first angular position to the second angular position based at least in part on the determined air speed of the aircraft, the determined rotational speed of the electric fan, or both.

14. The method of claim 11, further comprising:
driving the electric machine with the plurality of fan blades of the electric fan while the plurality of fan blades of the electric fan are in the first angular position to generate an initial amount of electrical power, and wherein moving the plurality of fan blades of the electric fan from the first angular position to the second angular position comprises moving the plurality of fan blades of the electric fan from the first angular position to the second angular position using at least in part the initial amount of electrical power.

15. The method of claim 1, wherein driving the plurality of fan blades of the electric fan with the electric machine comprises rotating the plurality of fan blades of the electric fan in a first rotational direction, and wherein driving the electric machine with the plurality of fan blades of the electric fan comprises rotating the plurality of fan blades of the electric fan in a second rotational direction, opposite the first rotational direction.

16. The method of claim 1, wherein the aircraft propulsion system further comprises a first propulsor, wherein the first propulsor is a gas powered propulsor, and wherein the method further comprises:
operating the first propulsor to generate electrical power, and wherein driving the plurality of fan blades of the electric fan with the electric machine comprises providing the electric machine with at least a portion of the electrical power generated through the operation of the first propulsor.

17. The method of claim 1, the aircraft comprises an aft end, and wherein the electric fan is a boundary layer ingestion electric fan mounted at the aft end of the aircraft.

18. The method of claim 1, wherein the electric machine of the electric fan is mechanically coupled to the plurality of fan blades of the electric fan through a gearbox.

19. An aircraft comprising:
a fuselage extending between a forward end and an aft end;
a wing extending from the fuselage; and
a propulsion system, the propulsion system comprising:
an electric generator;
a gas turbine engine mounted to the wing of the aircraft, the gas turbine engine configured to drive the electric generator to generate electric power;
an aft engine mounted to the fuselage at the aft end of the fuselage, the aft engine comprising a fan and an electric machine in electrical communication with the electric generator, the aft engine further comprising one or more variable geometry components; and
wherein the electric machine of the aft engine is configured to drive the fan using at least in part the electric power generated by the electric generator in a first operating mode, and wherein the electric machine of the aft engine is configured to be driven by the fan to generate electrical power in a second operating mode in response to receiving data indicative of a failure condition of one or more components of the propulsion system.

20. The aircraft of claim 19, wherein the aft engine defines an axial direction, wherein the fan includes a plurality of fan blades, wherein each fan blade of the plurality of fan blades defines a positive angle with the axial direction when the plurality of fan blades are in a first angular position, and wherein each fan blade of the plurality of fan blades defines a negative angle with the axial direction when the plurality of fan blades are in a second angular position, and wherein the electric machine is configured to drive the plurality of fan blades using at least in part the electric power generated by the electric generator when the plurality of fan blades are in the first angular position, and wherein the electric machine is configured to be driven by the plurality of fan blades when the plurality of fan blades are in the second angular position to generate electrical power.

* * * * *